G. D. PARKER.
RECEPTACLE INVERTING APPARATUS.
APPLICATION FILED SEPT. 12, 1916.

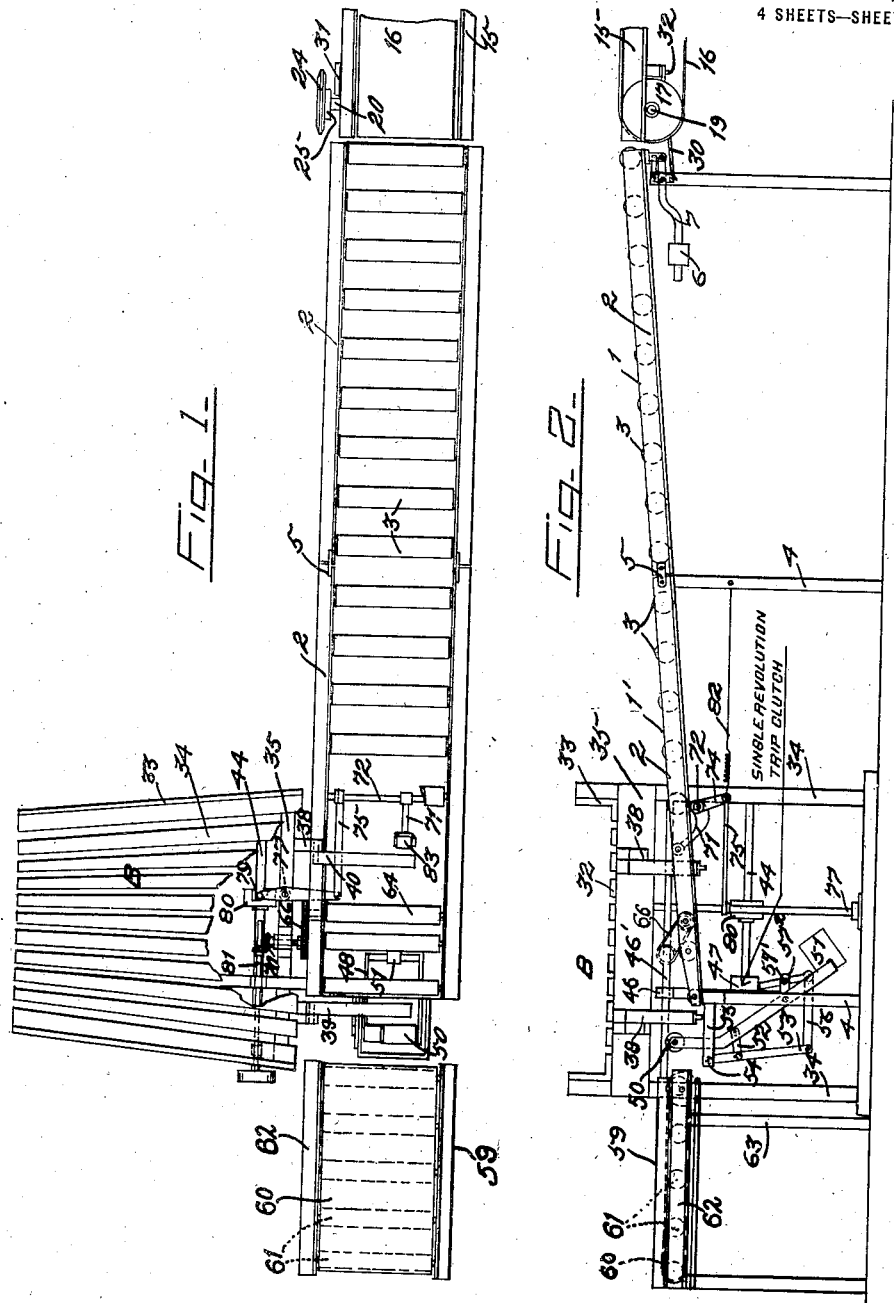

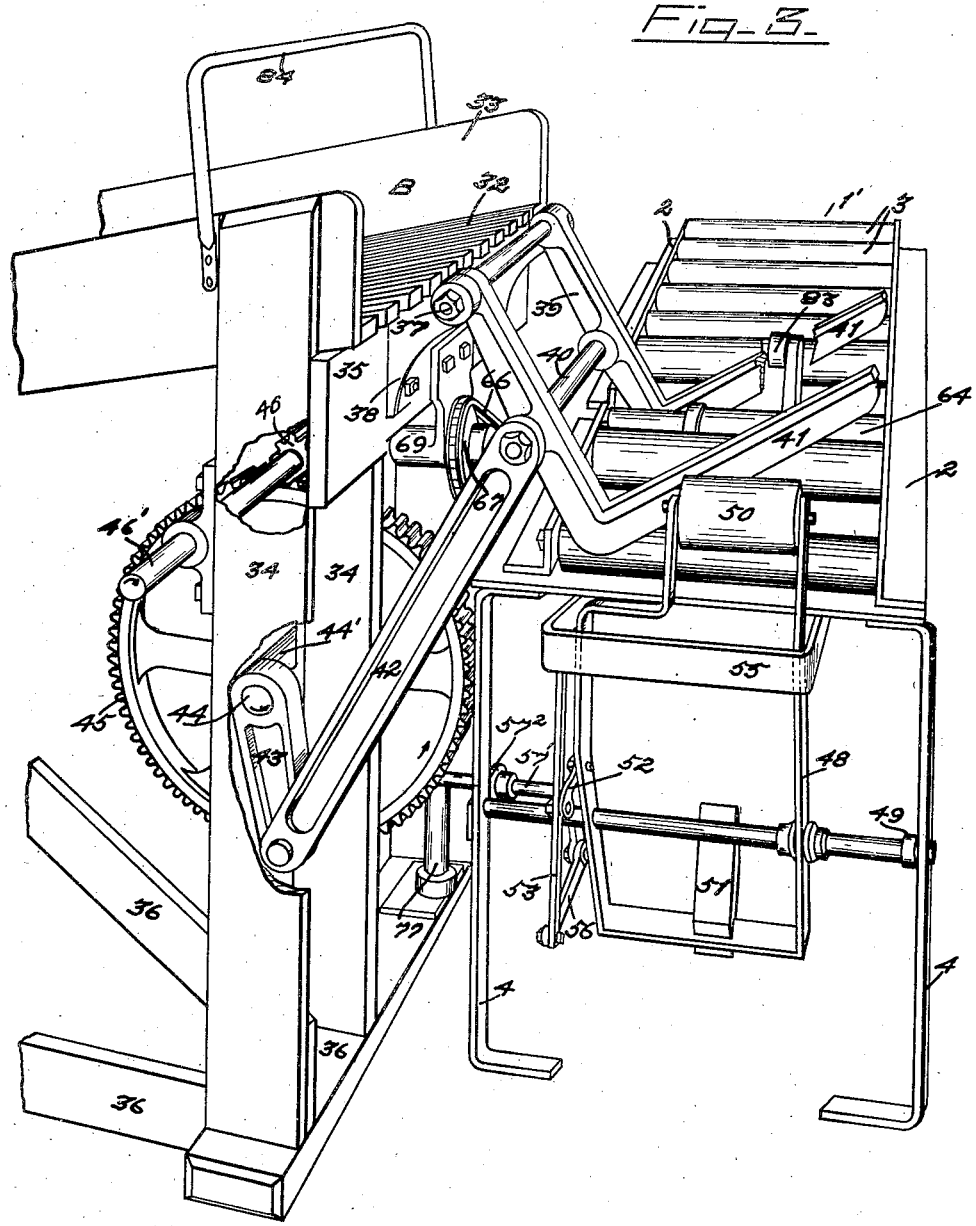

1,295,195.

Patented Feb. 25, 1919.
4 SHEETS—SHEET 3.

WITNESS

INVENTOR.
George D. Parker
BY
ATTORNEYS

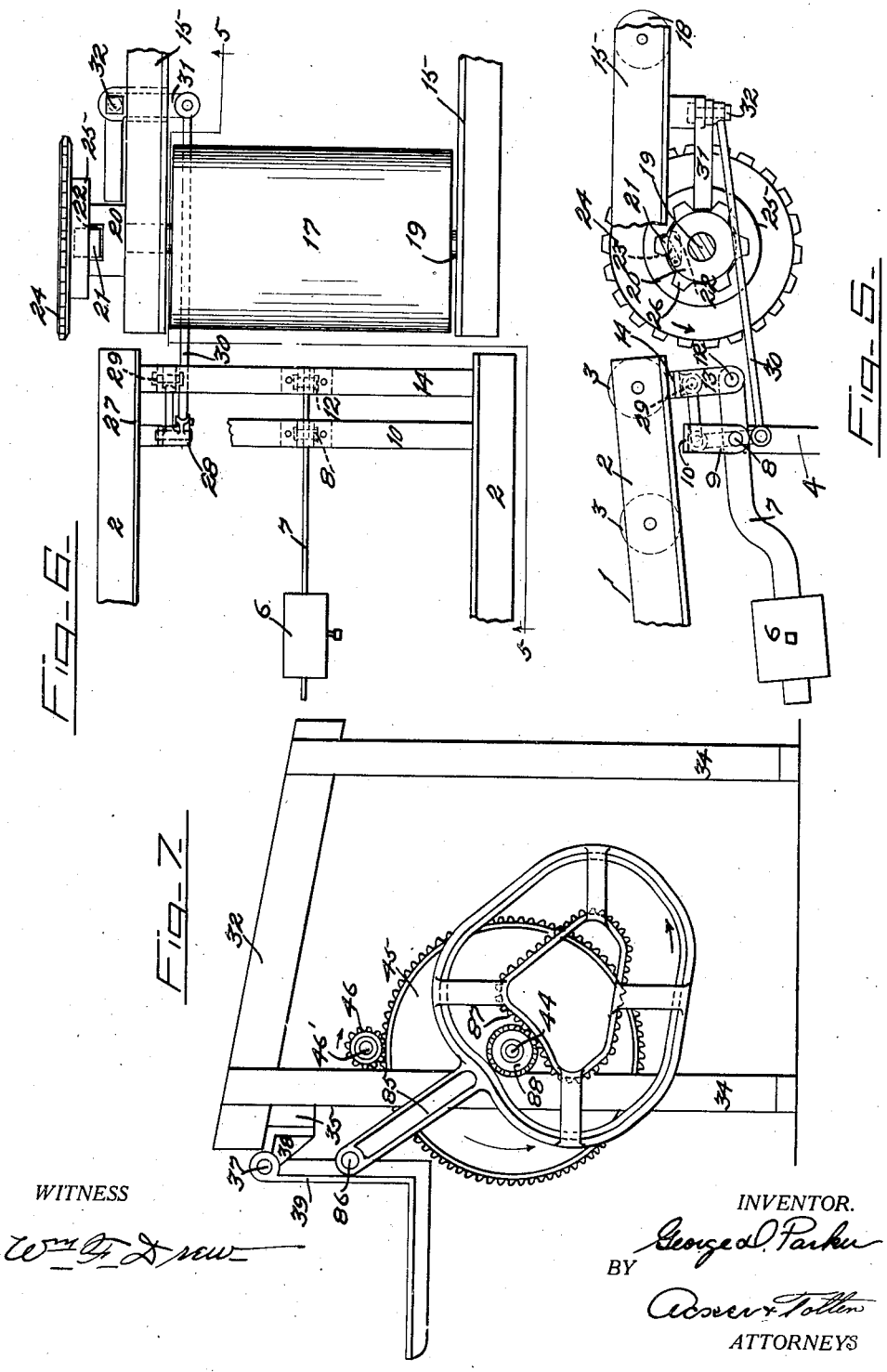

UNITED STATES PATENT OFFICE.

GEORGE D. PARKER, OF RIVERSIDE, CALIFORNIA.

RECEPTACLE-INVERTING APPARATUS.

1,295,195.  Specification of Letters Patent.  Patented Feb. 25, 1919.

Application filed September 12, 1916. Serial No. 119,732.

*To all whom it may concern:*

Be it known that I, GEORGE D. PARKER, a citizen of the United States, residing at Riverside, in the county of Riverside and State of California, have invented certain new and useful Improvements in Receptacle-Inverting Apparatus, of which the following is a specification.

The present invention relates to an apparatus for inverting boxes or receptacles to dump the contents therefrom, and is more particularly designed for use in the fruit packing industry to dump the fruit, such as oranges, lemons, and the like, from boxes or receptacles, preferably as delivered to the packing houses for the treatment, sizing or grading of the fruit prior to the final packing thereof, and the invention has for its principal objects to provide an apparatus which is low to the ground, thereby dispensing with the present elevating mechanism for raising the filled receptacles to the dumping or inverting devices; one wherein the filled receptacles are automatically conveyed to a suitable inverting mechanism and are successively removed therefrom and the contents thereof dumped; one provided with means for disposing of the receptacles after the contents have been emptied therefrom, and one provided with means controlled by the positioned filled receptacle for actuating connections to cause the operation of the inverting means.

The invention consists broadly in a runway having a portion adapted for receiving the filled receptacles and a portion for discharging the emptied receptacles to a suitable place of deposit, and having means intermediate said portions for inverting the filled receptacles as conveyed to dump the contents therefrom and for depositing the inverted receptacles onto said receptacle discharge portion.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in plan of the preferred embodiment of my invention.

Fig. 2 is a view in side elevation of the apparatus disclosed in Fig. 1.

Fig. 3 is an enlarged view in perspective of the receptacle runway and the inverting mechanism with the inverting frame slightly elevated.

Fig. 5 is a view in detail of the receptacle feed controlling means.

Fig. 6 is a view in plan of the receptacle feed controlling means illustrated in Fig. 5.

Fig. 7 is a modified form of operating means for the inverting frame.

Figure 4:
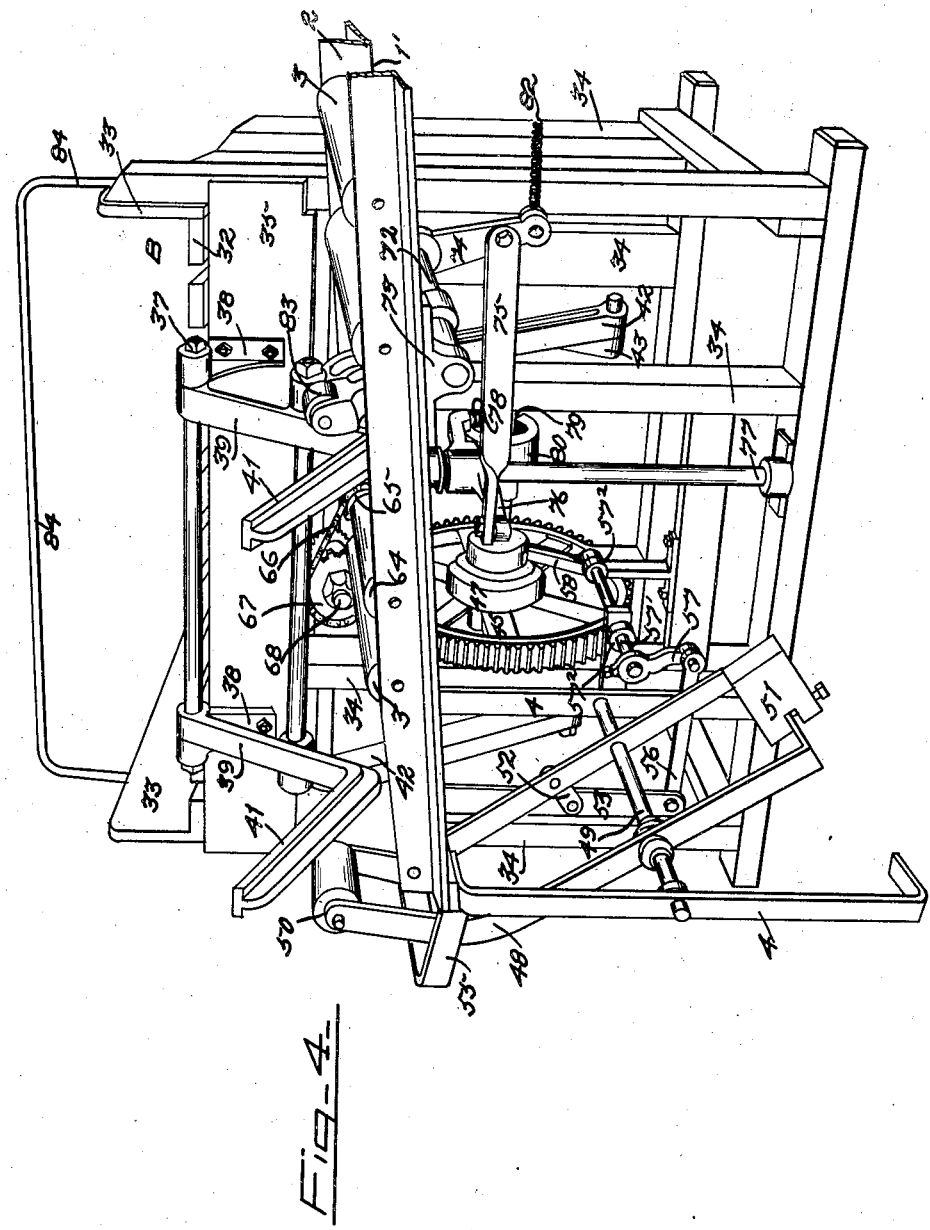
Fig. 4 is a view in perspective, taken from the front of the apparatus, with the parts in the position as in Fig. 3, illustrating more fully the controlling and operating mechanism for the inverting means.

Referring more particularly to the several views of the drawings, wherein like characters of reference designate corresponding parts, 1 and 1' indicate the alined portions of a suitable inclined runway, comprising the downwardly inclined side members 2 and transverse receptacle supporting rollers 3. The ends of the side members 2 forming the portion 1' of the runway are supported by uprights 4 and the elevated end of said portion 1' is connected to the lower coöperating end of the portion 1 through suitable links 5, which permit a vertical pivotal movement of the opposite or elevated end of the portion 1 of the runway.

The elevated end of the portion 1 of the runway is supported by a weight 6 adjustably mounted on a lever 7 pivoted within its length, as at 8, to a bracket 9 carried by a transverse member 10, supported by the uprights 4, and the end of said lever is pivotally connected through a pivot 12 with a bracket 13 depending from the underside of an end member 14 secured to the side members 2. The weight 6 is sufficient to prevent the depressing of the free end of the runway until the runway is full to its capacity with filled receptacles, at which time the weight of the receptacles and contents will overbalance the weight 6 and permit a slight downward movement of the runway.

Alining with the free end of the portion 1 of the runway is a suitable conveyer for supplying filled receptacles thereto, and for purposes of illustration the same consists of spaced side rails 15 between which operates the belt 16 traveling over the end drum 17 and rolls 18—Figs. 1, 2, 4 and 5 of the drawings. The drum 17 is carried by a shaft 19 which mounts at one end a disk 20 carrying on its periphery a pivoted pawl 21, outwardly pressed by the spring 22 and adapted for reception in the recess 23 in the periphery of the disk 20. A suitable drive sprocket 24 is loosely mounted on the shaft 19 and is adapted to operate the belt 16. The sprocket 24 is provided with the cored offset 25 for the reception of the disk 20 and said offset is formed on its inner peripheral wall with the teeth 26 between which is adapted to extend the pawl 21 when it is desired to drive the shaft 19 through power delivered from the sprocket 24.

To automatically control the disengagement of the driving connection between the conveyer belt 16 and the sprocket 24 to arrest the feed of the filled receptacles from the conveyer to the runway when the runway is filled, a suitable bell crank 27 is pivoted as at 28 to a bracket on the member 10 and the end of one arm thereof is connected as at 29 to the member 14 and the end of the other arm thereof is pivotally connected through a link 30 with the end of one arm of a bell crank 31 pivoted as at 32 to swing on a vertical axis beneath one of the conveyer side rails 15. The other end of the bell crank 31 is adapted through the operation of the described connection, on the downward movement of the free end of the portion 1 of the runway, to swing into the path of rotation of the pawl 21 and to disengage the same from the coöperating teeth 26 by forcing the pawl into the recess 23, thus interrupting the feeding of the filled receptacles to the runway until such time as certain of those already fed thereto are disposed of.

Positioned preferably at one side of the portion 1' of the gravity runway is a suitable mechanism for lifting the filled receptacles from the runway, inverting the same to dump the contents therefrom and for depositing the same onto the conveyer for carrying to a suitable place of deposit. The preferable embodiment of said mechanism is illustrated more fully in Figs. 1 to 4 of the drawings, and comprises a suitable receptacle contents receiving trough B, having a bottom member 32 downwardly inclined from said runway and coöperating sides 33. The trough B is supported by suitable uprights 34 and braces 35 and 36.

Pivoted on a horizontal axis, as at 37, to brackets 38 carried by the brace 35, immediately below the receiving end of the trough B, is a receptacle engaging frame comprising the arms 39 connected as at 40 with their free ends bent or curved at right angles to the main portion thereof, as at 41. The bent portions 41 of the arms 39 are adapted, when the frame is in its lowermost position, to assume a substantially horizontal position, and to be received between certain of the receptacle supporting rollers 3, as in Fig. 2 of the drawings. The receptacle inverting frame is raised and lowered on its pivot 37 to invert the receptacles to dump the contents therefrom, by a link 42 connected with a crank 43 of the rotatable shaft 44 mounted in bearings 44' on the uprights 34.

Rotatably mounted on said shaft 44 is a gear 45 driven by a pinion 46 carried by a drive shaft 46' and rotated in the direction of the arrow—Fig. 3, from power received from any suitable source.

A trip clutch 47, of any well known type, capable of being purchased on the open market, adapted when actuated to remain engaged for any given operation and then to automatically release, is carried by and rotatable with the shaft 44. The clutch when actuated is adapted to engage the hub of the gear 45 and cause the shaft 44 to make a complete revolution.

Each complete revolution of the shaft 44 raises and lowers the inverted frame, and to control said shaft to operate only when a receptacle is within the sphere of movement of the inverting frame, the following mechanism is provided:—

A trip frame 48, pivotally mounted as at 49 to one of the supports 4 projects upwardly adjacent the lower end of the portion 1' of the runway and within the path of the filled receptacles, to be engaged by the receptacles as they overlie the arms 39. The upper end of the frame 48 carries an antifriction roller 50, and at its lower end is provided with a counterbalancing weight 51. The upper portion of the frame 48 connects through a link 52 with an arm 53 fulcrumed as at 54 to a support 55 carried by one of the uprights 4, and the lower end of the arm 53 connects through a link 56 with one end of an arm 57 carried by a shaft 57' rotatable in bearings 57², and said shaft carries on its opposite end a clutch operating lever 58. The free end of the lever 58 coöperates with the clutch 47 and on each forward and downward movement of the trip frame 48, due to the momentum and weight of the filled receptacles when passing over the arms 39, actuates the clutch 47 to cause the shaft 44 and gear 45 to rotate in unison for a complete revolution, at which time the inverting frame will be raised and lowered.

As the filled receptacles are elevated from the portion 1' of the runway, thus relieving the pressure from the upper end of the trip frame, the weight 51 causes the trip frame 48 to swing upwardly and rearwardly to assume its normal position, as in Figs. 1, 3 and 4 of the drawings, and when in this position, the upper end of the trip frame lies at a point beneath the emptied receptacles, as the same are lowered by the inverting frame, and maintains the forward end of the inverted receptacles elevated a slight distance above the end of a suitable conveyer 59 which is in alinement with the lower end of the portion 1' of the runway and is positioned with one of its ends a short distance therefrom.

The conveyer 59 which is adapted to remove the emptied receptacles and to convey the same from the inverting mechanism to a suitable place of deposit, comprises an endless belt 60 operating over supporting members 61 rotatably supported by the side frame members 62 carried by the uprights 63, the belt being driven by power received from any suitable source.

To assist the filled receptacles in their movement toward the trip frame 48 to insure the operation thereof and also to assist the removing of the emptied receptacles from the inverting frame, a power driven roller 64 is preferably positioned between the side frame members 2 of the portion 1' of the runway between the arms 39, and said roller carries on its end a sprocket 65 driven by a chain 66 which operates over a sprocket 67 on a shaft 68 carried in a bearing 69 and which is driven by the drive shaft 56' through a beveled gear connection 70.

To prevent the passing of a filled receptacle within the path of movement of the inverting frame, after the shaft 44 has begun its cycle of rotation to cause the raising and lowering of the inverting frame to dump the contents of the succeeding receptacles, a retaining member or arm 71 projecting upwardly from beneath the runway at a point in advance of the arms 39 is carried by a shaft 72 in bearings 73 beneath the side members 2. An arm 74 depends from the shaft 72 and is pivotally connected through a link 75 with one end of an arm 76 secured within its length to a pivoted support 77 and carrying at its opposite end a roller 78 which coöperates with a cam slot 79 in the cam 80 mounted on the shaft 44.

It will be apparent on the rotation of the shaft 44 in the direction of the arrow in Fig. 1 of the drawings, that the cam 80 will also be rotated, and in its movement will cause the beveled face 81 thereof to force the roller 78 outwardly and cause the same to contact with the peripheral surface of the cam during the complete rotation of the shaft 44. The outward movement of the cam lever forces the retaining member or arm 71 upwardly above the runway to arrest the downward movement of the receptacle immediately in rear of the receptacle engaged by the inverting frame, and the succeeding receptacles are thus prevented from passing into the path of movement of the inverting frame until such time as the arms thereof have reached their lowermost position and the roller 78 is permitted to seat in the cut-out in the cam 80. A suitable coiled spring 82 assists in the downward movement of the retaining member, and said member is provided on its upper end with a suitable anti-friction roller 83 which permits the passage of the receptacles thereover at such time as the same is in its lowermost position.

If necessary, a suitable receptacle retaining brace or wire 84 may connect and extend upwardly from the side members 33 of the trough B and which limits the tilting motion of the receptacles when the same are in their inverted position.

In Fig. 7 of the drawings, there is illustrated a modified form of drive mechanism for the inverting frame and the same consists of an arm 85 pivotally mounted as at 86 to the arms of the inverting frame and carrying at its end a mutilated substantially triangular cam gear 87 which is adapted to be driven by a pinion 88 mounted on the shaft 44.

The construction of the gear 87 is such that when the shaft 44 and gear 45 rotate in the direction of the arrow, Fig. 7, the inverting frame will have a slow upward movement and a quick return to normal position.

Briefly, the device operates as follows: Filled receptacles to be dumped are supplied to the section 1 of the run-way by the belt 16, and travel by gravity over said section on to the section 1, the foremost receptacle striking the trip bar 48 which arrests the movement thereof directly over the arms 39, said trip bar being swung downwardly by the weight of the filled receptacle engaging the same. The operation of the trip frame throws the clutch 47 into engagement causing the rotation of the shaft 44 for a complete revolution which through the interconnected mechanism causes an upward movement of the retaining arm 71 to retain the successive receptacles on the runway and without the path of the inverting arms 39, during their operation. The rotation of the shaft 44 causes the raising and lowering of the arms 39 which lift the positioned filled receptacle, inverting the same to dump the contents therefrom and return the emptied receptacle to a horizontal position with one end resting on the roller 50 and the other end on the rotating roller 64. The rotation of the roller 64 assists in the conveying of the emptied receptacle on to the belt 60 which disposes of the emptied receptacle in any suitable manner. The weight 51 is sufficient to restore the trip frame 48 to the position as in Fig. 1 on the removal of the filled receptacle therefrom and to support the emptied receptacle as lowered on to the upper end thereof. The returning of the trip frame 48 to normal position, enables the same to be operated by the next receptacle in order to engage the clutch for a successive complete rotation of the shaft 44 as the clutch is of such type as to disengage on each complete rotation of the shaft. Each successive complete rotation of the shaft 44 permits the retaining arm 71 to assume its normal position as in Fig. 1 which admits of the next filled container to pass over the arms 35 and the contents to be dumped therefrom as heretofore described.

It is apparent that I have provided a mechanism for successively inverting receptacles to dump the contents therefrom; one provided with a mechanism controlled in such manner that if there is no receptacle within the sphere of the inverting mechanism, the said mechanism does not operate; one wherein the operating of the inverting mechanism interrupts the movement of the filled receptacles toward the same, and one wherein the feeding of the receptacles toward the inverting means or mechanism is controlled by the inverting of the receptacles and the disposal thereof from the apparatus, and these various features I wish to be understood as claiming and covering as broadly as the state of the art will permit.

Having thus described my invention, what I claim as new and desire to protect by Letters Patent is:—

1. A receptacle dumping apparatus comprising a substantially horizontal runway for conveying the filled receptacles, receptacle controlled trip means within the path of travel of the receptacles on said runway for successively inverting the same to dump the contents therefrom and for returning the emptied receptacles to normal position, means carried by said trip means for coöperating with an empty receptacle in its return to normal position for assisting in the removal thereof from the inverting means and means for receiving and carrying emptied receptacles to a suitable place of deposit.

2. A receptacle dumping apparatus, comprising a substantially horizontal runway for conveying the filled receptacles, receptacle controlled trip means swinging on a horizontal axis within the path of travel of the receptacles on said runway for successively inverting the same to dump the contents therefrom and for returning the emptied receptacles to normal position, rotating means for coöperating with an emptied receptacle on its return to normal position for assisting in the removal thereof from the inverting means, and means for receiving and carrying the emptied receptacles to a suitable place of deposit.

3. An apparatus for dumping fruit from boxes or the like, comprising a substantially horizontal runway for receiving the filled boxes to be dumped, conveying means associated with said runway for conveying the filled boxes longitudinally thereof, a horizontal runway disposed substantially in alinement with said first mentioned runway and in substantially the same plane therewith for receiving the boxes after the contents have been dumped therefrom, a conveyer associated therewith for conveying the boxes to the discharge end, and means intermediate said runways and over which the filled boxes are successively conveyed in their travel from one runway to the other for engaging and inverting the boxes to dump the fruit therefrom.

4. A receptacle dumping apparatus, comprising a receptacle inverting means, means for conveying filled receptacles within the sphere of the inverting means, drive connections for operating said inverting means, receptacle actuated trip mechanism for throwing said drive mechanism into operative relation on the passing of a filled receptacle within the sphere of the inverting means to cause the inverting means to operate to dump the contents from said receptacle, means for receiving the dumped contents of the receptacle, and means for receiving and conveying the emptied receptacles from the apparatus.

5. A receptacle dumping apparatus, comprising a receptacle inverting means, drive mechanism for operating said inverting means, means for conveying filled receptacles to the inverting means for the dumping of the contents therefrom, means actuated by the positioned receptacle to be dumped for throwing said drive mechanism into operative relation to cause a complete cycle of movement of the inverting means, and separate means for receiving the emptied receptacle and its contents.

6. A receptacle dumping apparatus, comprising a substantially horizontal runway for conveying the filled receptacles, a conveyer disposed substantially in alinement with said runway and in substantially the same plane therewith for receiving the receptacles after the contents have been dumped therefrom and for conveying the same to a suitable place of deposit, and a receptacle inverting mechanism intermediate said runway and conveyer for successively inverting the receptacles as conveyed on said runway to dump the contents therefrom and for positioning the emptied receptacles to be removed by said conveyer.

7. A receptacle dumping apparatus, comprising a receptacle inverting means, trip controlled means for operating the same, means for receiving the dumped contents from the receptacles, substantially horizontal means for feeding filled receptacles to be dumped to the inverting means, and substantially horizontal means for conveying the emptied receptacles from the apparatus.

8. A receptacle dumping apparatus, comprising a receptacle inverting mechanism pivoted to swing on a substantially horizontal axis, trip controlled means for operating the same, a substantially horizontal runway at one side of said inverting mechanism for feeding filled receptacles thereto, a substantially horizontal conveyer at the other side of said inverting mechanism for conveying the emptied receptacles therefrom, and means for receiving the contents of the receptacles as dumped therefrom.

9. A receptacle dumping apparatus, comprising a substantially horizontal runway, a conveyer for feeding filled receptacles thereto, means controlled by the receptacles on said runway for interrupting the feeding of filled receptacles thereto, means pivoted to swing upwardly on a horizontal axis for successively removing said filled receptacles from said runway and for inverting the same to dump the contents therefrom, means for receiving the dumped contents from the receptacles, means for receiving and conveying the emptied receptacles to a suitable place of deposit, and means for arresting the movement of the filled receptacles toward the receptacle inverting mechanism while the same is in operation.

10. A receptacle dumping apparatus, comprising a runway longitudinally of which the filled receptacles to be dumped move by gravity, a conveyer for feeding filled receptacles to said runway, means for successively removing said filled receptacles from said runway and for inverting the same to dump the contents therefrom, a power shaft, a normally disengaged driving connection between said power shaft and inverting means, a trip means actuated by a filled receptacle as positioned to be inverted by said inverting means for throwing said driving connection into engagement, means for receiving the contents as dumped from the receptacle, and means for carrying the emptied receptacles from the apparatus.

11. In combination with a receptacle dumping device, a run-way over which filled receptacles are fed by gravity thereto, a drive mechanism for said dumping device normally in disengaged position, of means actuated by a filled receptacle as positioned to be dumped by said dumping device for throwing into engaged relation the elements of said drive mechanism to permit the operation of said dumping device, and means thrown into operation during the dumping of the positioned receptacle for retaining successive filled receptacles from movement within the sphere of operations of the dumping device during the operation thereof.

12. In combination with a receptacle controlled dumping device, means for feeding receptacles thereto, means for receiving the contents as dumping from the receptacles, means for receiving and conveying the emptied receptacles from the dumping device, and continuously operated means for assisting in the removal of the emptied receptacles from the dumping means to the receiving and conveying means.

13. In combination with a receptacle dumping device, a horizontally disposed runway over which receptacles are fed thereto, means for receiving the contents as dumped from the receptacles, a substantially horizontal conveyer in alinement with said runway for receiving and conveying the emptied receptacles from the dumping device, said conveyer being disposed in substantially the same plane with said run-way and means for assisting in the removal of the emptied receptacles from the dumping means to the conveyer.

14. In combination with a receptacle dumping device, a substantially horizontal runway for conveying filled receptacles thereto, means for receiving the contents as dumped for the receptacles, a conveyer substantially horizontally disposed in a corresponding plane and in a line with said runway for receiving and conveying the emptied receptacles from the dumping device, and means within the path of movement of the filled receptacles as operated by said dumping device for assisting in the removal of the emptied receptacles from the dumping means to the last mentioned conveyer.

15. A receptacle dumping apparatus, comprising an inverting frame pivoted to swing upwardly on a horizontal axis, a runway within the path of pivotal movement of said frame and transversely of which said frame pivots for conveying filled receptacles to be dumped thereto, means for receiving the dumped contents from the receptacles, and means adjacent said runway for receiving the emptied receptacles from said frame and for conveying the same to a suitable place of deposit.

16. A receptacle dumping apparatus, comprising a receptacle inverting mechanism pivoted to swing on a substantially horizontal axis, means for operating the same, means tripped by a filled receptacle in passing within the sphere of movement of said inverting means for connecting the same for movement by said operating means to invert a receptacle to dump the contents therefrom and for returning the empty receptacle to a substantially horizontal position, a conveyer for receiving the empty receptacle as removed from said inverting means and for conveying the same to a suitable place of deposit, and means for cooperating with said empty receptacle when restored to substantially horizontal position by said inverting means for assisting in the removal therefrom and onto said last mentioned conveyer.

17. A receptacle dumping apparatus, comprising a receptacle inverting mechanism pivoted to swing on a substantially horizontal axis, means for operating the same, a conveyer for feeding filled receptacles to said inverting means, means for limiting the movement of a filled receptacle within the sphere of movement of the inverting means, means tripped by a filled receptacle in passing within the sphere of movement of said inverting means for connecting the inverting means for movement by said operating means to invert the positioned receptacle to dump the contents therefrom and for returning the empty receptacle to substantially horizontal position, means for restoring said actuated trip means on the removal of the filled receptacle from contact therewith to a position within the path of movement of the empty receptacle in its return to a substantially horizontal position, said returned trip means elevating one end of the empty receptacle above said limiting means, a conveyer for receiving the empty receptacle as moved from said inverting means, and means coöperating with an empty receptacle in its return to substantially horizontal position by said inverting means for assisting in the removal therefrom and onto said last mentioned conveyer.

In testimony whereof I have signed my name to this specification in the presence of two subscribing witnesses.

GEORGE D. PARKER.

Witnesses:
S. A. MARKS,
W. P. SHEPHERD.